United States Patent [19]

Aranovsky et al.

[11] Patent Number: 5,001,580

[45] Date of Patent: Mar. 19, 1991

[54] METHOD TO COMPENSATE FOR TAPE SLOPE AND HEAD AZIMUTH ERRORS

[75] Inventors: Anatoly Aranovsky, Tustin; William A. Buchan, Corona del Mar, both of Calif.

[73] Assignee: Archive Corporation, Costa Mesa, Calif.

[21] Appl. No.: 413,479

[22] Filed: Sep. 27, 1989

[51] Int. Cl.$^5$ ............................................. G11B 5/56
[52] U.S. Cl. ................................. 360/77.120; 360/76; 360/78.02
[58] Field of Search ..................... 360/76, 77.12, 78.02

[56] References Cited

U.S. PATENT DOCUMENTS

| | | | |
|---|---|---|---|
| 3,292,168 | 12/1966 | Gray | 340/174.1 |
| 3,541,270 | 11/1970 | Walther | 179/100.2 |
| 4,313,141 | 1/1982 | Yanagida et al. | 360/78 |
| 4,414,593 | 11/1983 | Miller et al. | 360/102 |
| 4,466,027 | 8/1984 | Howell et al. | 360/66 |
| 4,476,503 | 10/1984 | Solhjell | 360/75 |
| 4,563,713 | 1/1986 | Cahoon et al. | 360/75 |
| 4,609,959 | 9/1986 | Rudi | 360/75 |
| 4,679,104 | 7/1987 | Dahlerud | 360/78 |
| 4,866,548 | 9/1989 | Rudi | 360/77 |

OTHER PUBLICATIONS

IBM Technical Disclosure Bulletin, vol. 17, No. 6, Nov. 1974, Servo Pattern for Measuring Position Error in Tape Systems, K. Y. Wang, p. 1751.

*Primary Examiner*—Aristotelis M. Psitos
*Assistant Examiner*—David L. Robertson
*Attorney, Agent, or Firm*—Knobbe, Martens, Olson & Bear

[57] ABSTRACT

A method is provided to compensate for tape slope (A) and read/write head block (102) azimuth (B) errors in a tape drive system (100). The method writes a data pattern (504) on a magnetic medium (104) at a known slope (C). The portion of the magnetic medium (104) that is encoded with the data pattern (504) is then moved across the read/write head block (102), so that first one read head (154) and then the other read head (152) detects the recorded data pattern (504). The time difference ($\Delta T_{ON}$) between the event of each head (154, 152) first sensing the data pattern (504), and the time difference ($\Delta T_{OFF}$) between the points where each head (154, 152) no longer detects the data pattern (504), are both recorded. The recorded information is used to analyze the angular offset (A-B) between the centerline (192) of the tape (104) and the centerline (194) of the read/write head system (102). The angular offset (A-B) is used to determine a lateral displacement (D) between the two read heads (154, 152) in a direction perpendicular to the centerline (192) of the tape (104). The lateral displacement (D) is used to adjust the stepping distance between data tracks recorded in a first (i.e., forward) direction and a second (i.e., reverse) direction on the tape (104) so that the respective read head (152, 154) is positioned substantially on the center of the respective recorded track.

6 Claims, 9 Drawing Sheets

METHOD TO COMPENSATE FOR TAPE SLOPE AND HEAD AZIMUTH ERRORS

FIELD OF THE INVENTION

This invention pertains to streaming cartridge tape drives. In particular, the present invention is directed to a method for correcting write and read errors caused by head block and tape misalignment.

BACKGROUND OF THE INVENTION

It is well known that information can be encoded onto a magnetic medium, such as a magnetic disc or magnetic tape. Such encoding is usually accomplished by generating magnetic flux changes in close proximity to the magnetic medium. The magnetic flux changes can be generated by a magnetic read/write head system. In such a system, electronic signals are converted into magnetic flux by induction at a write gap in a write head. Furthermore, the signals from the magnetic medium are decoded by sensing magnetic flux changes at a read gap in a read head, the magnetic flux changes being produced by the movement of the magnetic medium past the read gap. The magnetic flux changes sensed at the read gap are converted into electronic signals via induction at the read gap.

Conventional magnetic head systems for tape drives comprise at least one read head and one write head. Often, such systems utilize multiple read and/or write heads mounted upon one head block. In an exemplary read/write system, there are three magnetic heads aligned on a head block. This type of head block comprises a forward read head, a write head, and a reverse read head. Normally, the write head is positioned between the two read heads. In the ideal case, the head centers are aligned in a straight line. Ideally, this straight line is also the center line along which the magnetic tape moves, so that there is no error in the alignment of the head block with respect to the center of the tape.

Usually, some error is introduced in the manufacturing process for both the tape cartridge and the head block. This generally unavoidable manufacturing error results in a misalignment of the tape with respect to the edge of the cartridge as well as a misalignment of the individual heads on the head block. In addition to this, the entire head block may be askew by some angle with respect to the base plate of the tape player/recorder.

When reading data in conventional steaming cartridge tape drives, it is necessary to alternate between a forward read head and a reverse read head each time the head block is moved to an adjacent data track. For this reason, it is advantageous to know the displacement error between the forward read head and the reverse read head, so that the read heads may be stepped accordingly as the head block switches to an adjacent data track.

It can be safely assumed for the purposes of the following discussion that the edge of the tape cartridge is aligned with the base plate of the tape player/recorder so that the two form an identical reference line. From this reference line, referred to hereinafter as the B-plane, the angle of displacement of the head block and the angle of displacement of the tape center line can be measured.

Relative to the B-plane, the tape itself may have some characteristic slope which can be specified as a number of minutes of arc, or a number of millimeters per inch. Additionally, the horizontal alignment of the magnetic heads may also have some slope relative to the B-plane. The net effect is that, if one head is centered on a track of the tape, another head which is horizontally displaced from the first head may be "off track" by a significant distance.

Previously, this problem of head-tape misalignment has not been considered a serious deficiency. This is because the tracks on conventional 60–100 Megabyte tapes have been wide enough to allow for such errors. However, with the advent of high density magnetic tapes having storage capacities on the order of 300 Megabytes, track widths have decreased to a point where a small misalignment between the head and the tape can lead to interference with information written on adjacent tracks. For this reason, problems with head-tape misalignment must be addressed.

Prior methods used to correct for head-tape misalignment have been sketchy, approximate techniques. For example, the head block may be moved laterally across the width of the track via a stepper motor until the amplitude of the signal stored on the tape was at a maximum. The distance stepped is then recorded. Thereafter, each time that head was used on that particular track, the head is stepped by the recorded distance. This method is deficient for a number of reasons. First of all, because the information may not be written at the same scaling amplitude over the entire tape, the amplitude may appear to be a maximum at a certain point when it is actually just an inconsistency in the recording. Secondly, since this type of test occurs over a small interval of time, many such tests would have to be performed in order to obtain some average stepping increment. Finally, this method is inexact and it may be difficult to determine where the amplitude of the signal is at its peak.

In another invention, disclosed in European Patent Application No. 87118762.1 (Publication No. 276,451), the edge of the magnetic medium is ascertained. Following this, the write head is moved laterally across the width of the tape some known distance via the stepper motor. The write head then records a data line along the tape. When the data stream is recorded, the edge of the tape is again determined, and the read head is moved up from the edge of the tape, first to the lower edge of the data line, then to the upper edge of the data line. The upper and lower position values of the read head are stored and averaged, so that the read head's theoretical position over the center of the data line is determined. The difference between the read head's averaged center position, and the write head recording position is stored as the error of alignment.

This method also has some inherent disadvantages. First of all, there is the added complexity of recognizing the edge of the tape. Tape edge recognition is susceptible to problems with the consistency of the magnetic medium since, in the manufacturing process, coating the edge of a tape with a magnetic material in a uniform manner is quite difficult. Also, it is often difficult to determine the exact location of the tape edge due to an uncertainty in the width of the track recorded by the write head. Secondly, since the head block must be moved across the tape as measurements are taken, mechanical complexity is introduced in the measuring process. Finally, in the method disclosed in European Patent Application No. 87118762.1 (Publication No. 276,451), the read head must be positioned so that the read head is near the written data line, otherwise the process could use a great deal of tape, as the head moves towards the track one increment at a time.

SUMMARY OF THE INVENTION

A method is provided to compensate for tape slope and read/write head block azimuth errors in a tape drive system. The method writes a stream of data on a magnetic medium at a known slope. The portion of the magnetic medium that is encoded with the data stream is then moved across the read/write head block, so that first one read head and then the other read head detects the recorded data stream. The time difference between when each read head first senses the data stream, and the time difference between when each read head no longer detects the data stream, are both recorded. This information is used to analyze the angular offset between the centerline of the tape and the centerline of the read/write head system. The angular offset is used to determine a lateral displacement between the two read heads in a direction perpendicular to the centerline of the tape. The lateral displacement is used to adjust the stepping distance between data tracks recorded in a first (i.e., forward) direction and a second (i.e., reverse) direction on the tape so that the respective read head is positioned substantially on the center of the respective recorded track.

The method of the present invention calibrates a read/write head system of a tape drive that writes data onto and reads data from a magnetic tape in a tape cartridge within the tape drive. The read/write head system comprises a write head that writes data onto the tape in the form of magnetic flux transitions. First and second read heads are provided to sense the magnetic flux transitions and generate electrical signal outputs responsive thereto. At least one read circuit is responsive to the electrical signal outputs of the first and second read heads to generate electronic data signals. The first and second read heads are aligned with respect to each other along a read head centerline therebetween. The tape moves within the cartridge in a direction defined by a tape centerline. The calibration method determines a displacement of the first read head with respect to the second read head in a direction perpendicular to the tape centerline. The method comprises the steps of writing a predetermined data pattern on a portion of said tape such that said data pattern is oblique to said tape centerline and then positioning the read/write head system so that the first and second read heads are positioned ahead of the predetermined data pattern. The method further comprises the step of moving the tape past the first and second read heads while monitoring the electrical signal outputs from the read heads to determine a time difference between when the first read head senses the predetermined data pattern and when the second read head senses the predetermined data pattern. Thereafter, the method calculates the displacement of the first read head with respect to the second read head using the time difference.

DETAILED DESCRIPTION OF THE PREFERRED EMBODIMENT

Figure 1:
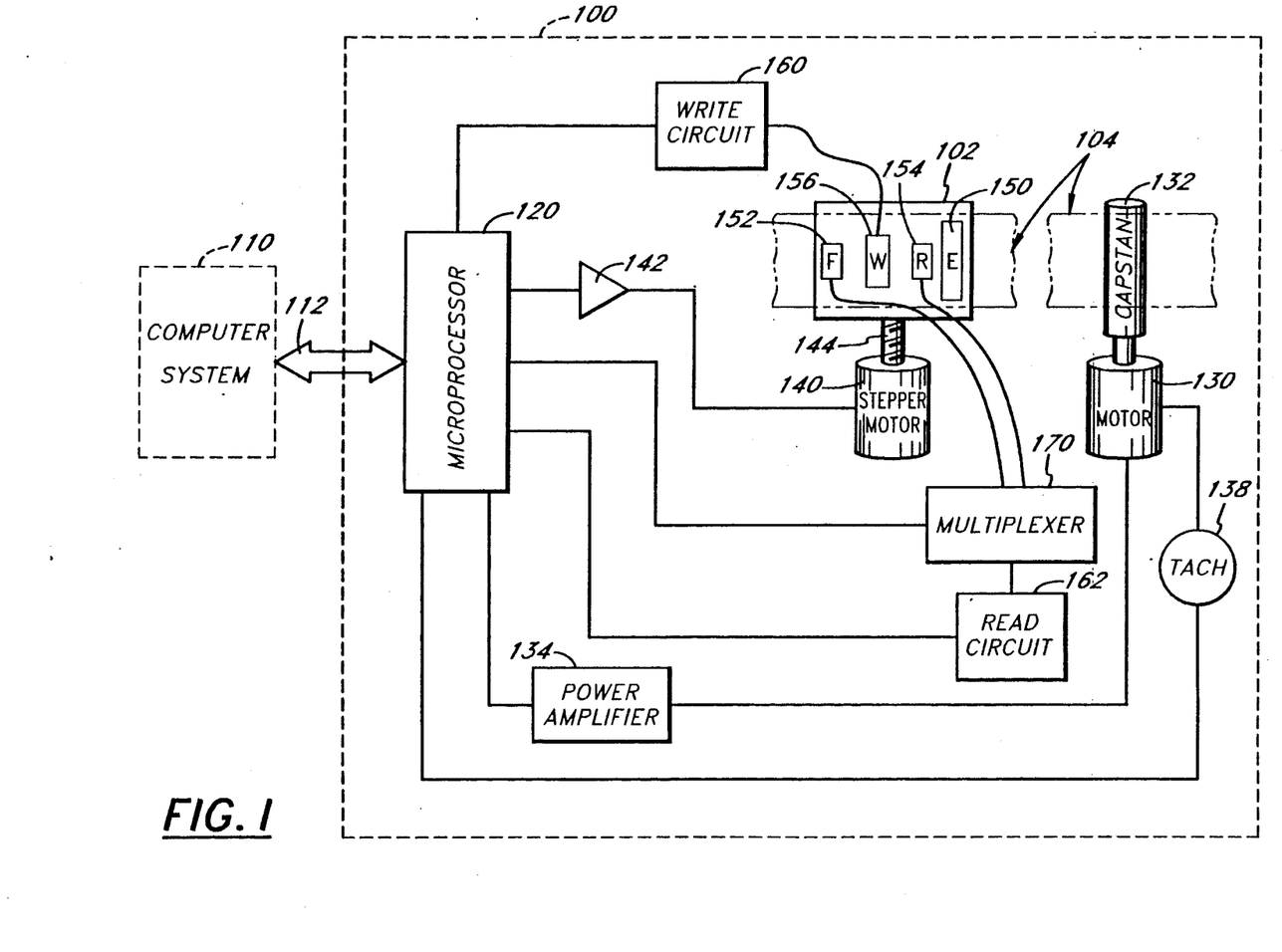
FIG. 1 is a simplified block diagram of an exemplary embodiment of a processor controlled tape drive including a schematic representation of the tape heads.

FIG. 1 illustrates a block diagram of an exemplary tape drive system 100 into which the present invention is incorporated. The tape drive system includes a read/write head system 102 which writes data onto and retrieves data from a magnetic tape 104. The tape drive system 100 is connectable to a computer system 110 (shown in phantom), or the like. For example, the computer system 110 may be an IBM ® PC, AT, PS/2, or any of a number of other commercially available computer systems. The computer system 110 generates commands to the tape drive system 100 to initiate operations. For example, such operations may include select, position, write data, write file mark, read data, read file mark, and read status commands. The tape drive system 100 responds to the commands by performing the selected function (e.g., writing data onto the tape 104 or reading data from the tape 104). Commands, data and status are communicated between the computer system 110 and the tape drive system 100 via a bus 112. The bus 112 is constructed to conform to one of a number of industry standards (e.g., the SCSI (Small Computer Systems Interface) standard).

The tape drive system 100 includes a microprocessor 120. The microprocessor 120 includes associated interface circuits (not shown) which allow it to communicate with the computer system 110 via the bus 112 and further allow it to send data and commands to and receive data and status from other circuits within the tape drive system 100.

The tape drive system 100 further includes a motor 130, a capstan 132, a power amplifier 134 and a tachometer 138. The microprocessor 120 outputs control signals to the power amplifier 134 which in turn provides power to the motor 130 to drive the capstan 132 in a conventional manner. The rotation of the capstan 132 causes the tape 104 to move longitudinally across the read/write head system 102. The tachometer 138 senses the rotational velocity of the capstan 132 and provides a feedback signal to the microprocessor 120. The microprocessor 120 responds to the feedback signal and varies the control signals applied to the power amplifier 134 so that the capstan 132 is driven at a constant predetermined rotational velocity. The motor 130 can be operated in either of two rotational directions to move the tape in a forward direction (right to left in FIG. 1) or a reverse direction (left to right in FIG. 1).

The tape drive system 100 further includes an amplifier 142 which drives a stepper motor 140. The microprocessor 120 outputs signals to the amplifier 142 to drive the stepper motor 140 in one of two rotational directions. The stepper motor 140 is mechanically connected to the read/write head system 102 via a lead screw 144. When the stepper motor 140 is stepped, the read/write head system 102 is moved laterally across the tape 104 (i.e., in a direction substantially perpendicular to the direction of motion of the tape 104). In the tape drive system described herein, the stepper motor 140 can be incrementally stepped so that the read/write head system 102 moves laterally across the width of the tape 104 in steps of 0.000125 inches.

The read/write head system 102 comprises an erase bar 150, a read forward head 152, a read reverse head 154, and a write head 156. As illustrated, the write head 156 is positioned between the read forward head 152 and the read reverse head 154.

The tape drive system 100 operates in a conventional manner to write data onto and read data from the tape 104. A write circuit 160 receives data from the computer system 110 via the microprocessor 120 and its associated circuits, and produces drive signals that generate magnetic flux changes on the tape 104. A read circuit 162 senses the magnetic flux changes on the tape 104 and converts the sensed flux changes to data signals that are communicated to the computer system 110 via the microprocessor 120 and its associated circuits.

In the embodiment illustrated in FIG. 1, the forward read head 152 and the reverse read head 154 are electrically connected to the read circuit 162 via a multiplexer 170. The multiplexer 170 selects which of the read heads 152, 154 is electrically connected to the read circuit 162 at any particular time. Generally, when the tape 104 is driven in the forward direction, the multiplexer 170 connects the forward read head 152 to the read circuit 162, and when the tape 104 is driven in the reverse direction, the multiplexer 170 connects the reverse read head 154 to the read circuit 162. As will be discussed below, the two read heads 152, 154 can be sampled by alternately switching the multiplexer 170 at a rapid rate to connect first one and then the other read head to the read circuit 162. As used herein, the forward direction is the direction in which the tape 104 is moving such that a portion of the tape 104 traverses the write head 156 immediately prior to traversing the forward read head 152. Thus, the data (i.e., flux changes) written onto the tape 104 can be immediately sensed by the forward read head 152 and converted to data by the read circuit 162. The sensed data can be compared to the written data to determine whether the data was properly written onto the tape 104. Conversely, the reverse direction is the direction in which the tape 104 is moving such that a portion of the tape 104 traverses the write head 156 prior to traversing the reverse read head 154 so that the data written in the reverse direction can be sensed by the reverse read head 154. As set forth above, the tape 104 moves from right to left in the forward direction and from left to right in the reverse direction.

In an alternative embodiment (not shown), separate read circuits may be provided for each of the forward read head 152 and the reverse read head 154 so that it is not necessary to include the multiplexer 170. The outputs of the two read circuits can be provided as inputs to the microprocessor 120 and its associated circuits. The data from one of the read circuits is selectively transmitted to the computer system 110 via the bus 112.

Control signals are sent to the write circuit 160, to the read circuit 162 and to the multiplexer 170 from the microprocessor 120 to selectively activate the appropriate circuits when writing data and reading data.

Figure 2:
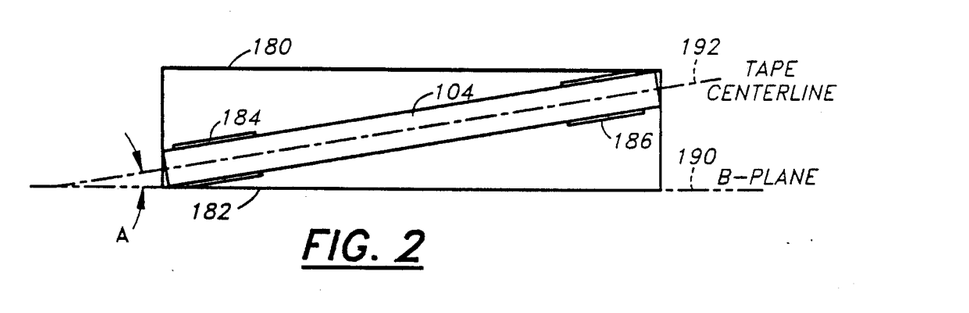
FIG. 2 pictorially illustrates an exemplary tape cartridge showing a section of tape between the two reels of the cartridge, the tape being shown with an exaggerated slope with respect to the base of the cartridge.

FIG. 2 pictorially illustrates the tape 104 within a tape cartridge 180. As is well known in the art, a conventional tape cartridge 180 for a streaming tape drive, comprises a base plate 182 onto which a pair of reels 184 and 186 are mounted. The tape 104 traverses between the two reels 184, 186. When the tape cartridge 180 is inserted into the tape drive 100, the read/write head system 102 is positioned proximate to the tape 104 between the two reels 184, 186, as illustrated pictorially by the juxtaposition of the read/write head system 102 over the tape 104, in FIG. 3. The tape 104 is also in contact with the capstan 132 (not shown in FIG. 3) which causes the tape 104 to move when the motor 130 is activated.

Figure 3:
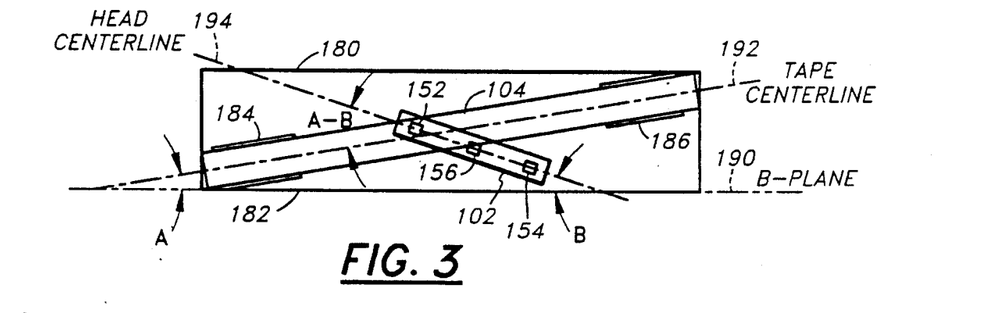
FIG. 3 pictorially illustrates the tape cartridge and tape of FIG. 2, and further illustrates a tape head system superimposed on the tape, the tape head system being shown at an exaggerated angle with respect to the base of the cartridge.

Ideally, the tape 104 moves longitudinally between the two reels 184, 186 in a straight line parallel to the base plate 182. The base plate 182 defines a plane which is referred to herein as the B-plane 190. As illustrated in FIGS. 2 and 3, the portion of the tape 104 has a tape centerline 192. The tape centerline 192 may be skewed from the B-plane 190 by an angle "A" as depicted. It should be noted that the angle "A" has been exaggerated in FIGS. 2, 3, and 4 in order to clearly depict the offset of the tape centerline 192 from the cartridge B-plane 190.

As illustrated in FIG. 3, the read/write head system 102 has a centerline 194. The centerline 194 of the read/write head system 102 may be misaligned by an angle "B" (also exaggerated) from the B-plane 190. The alignment difference between the read/write head system centerline 194 and the tape centerline 192 is shown as the angle "A-B".

Figure 4:
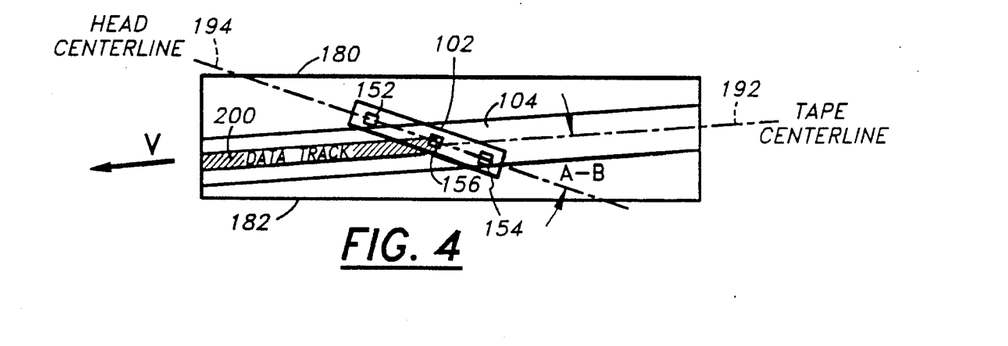
FIG. 4 pictorially illustrates a data track written onto a section of tape by the write head, and further illustrates the offset of the read heads from the data track caused by the angular misalignment of the read/write head system with respect to the tape.

If the misalignment of the tape centerline 192 and the misalignment of the read/write head system 194 are additive (e.g., "A" positive and "B" negative, as shown, or "A" negative and "B" positive), then the net displacement can be significant. FIG. 4 illustrates the effect of such a net displacement. As illustrated, a data track 200 is written onto the tape 104 in parallel with the tape centerline 192. Since the read/write head system 102 is oriented at an angle with respect to the tape centerline 192, the read forward head 152 and the read reverse head 154 are displaced from the center of the data track 200. The net displacement of the read forward head 152 from the center of the data track 200 depends upon the size of the angle "A-B" and the spacing between the read forward head 152 and the write head 156. (Again, the angle "A-B" and the displacement are highly exaggerated in the drawing figures. In actual embodiments, the angle "A-B" is small, and the two heads will be laterally displaced with respect to each other by less than one track width.) Similarly, the net displacement of the read reverse head 154 from the center of the data track 200 depends upon the size of the angle "A-B" and the spacing between the read reverse head 154 and the write head 156. The net displacements may be sufficiently great that after the data track 200 is written, the read forward head 152 and the read reverse head 154 will not adequately sense the flux changes in the data track 200. Thus, the read/write head system 102 needs to be moved laterally (i.e., substantially perpendicular with respect to the tape centerline 192) in order to position the respective read forward head 152 or read reverse head 154 proximate to the data track 200 when reading the data track 200 in the forward or reverse direction.

The present invention is a method that automatically detects the skew (i.e., angle "A-B") between the tape centerline 192 and the read/write head system centerline 194. The method will be described in detail with reference to the flowcharts of FIGS. 5, 8, and 9 and the pictorial illustrations of FIGS. 6 and 7.

Figure 5:
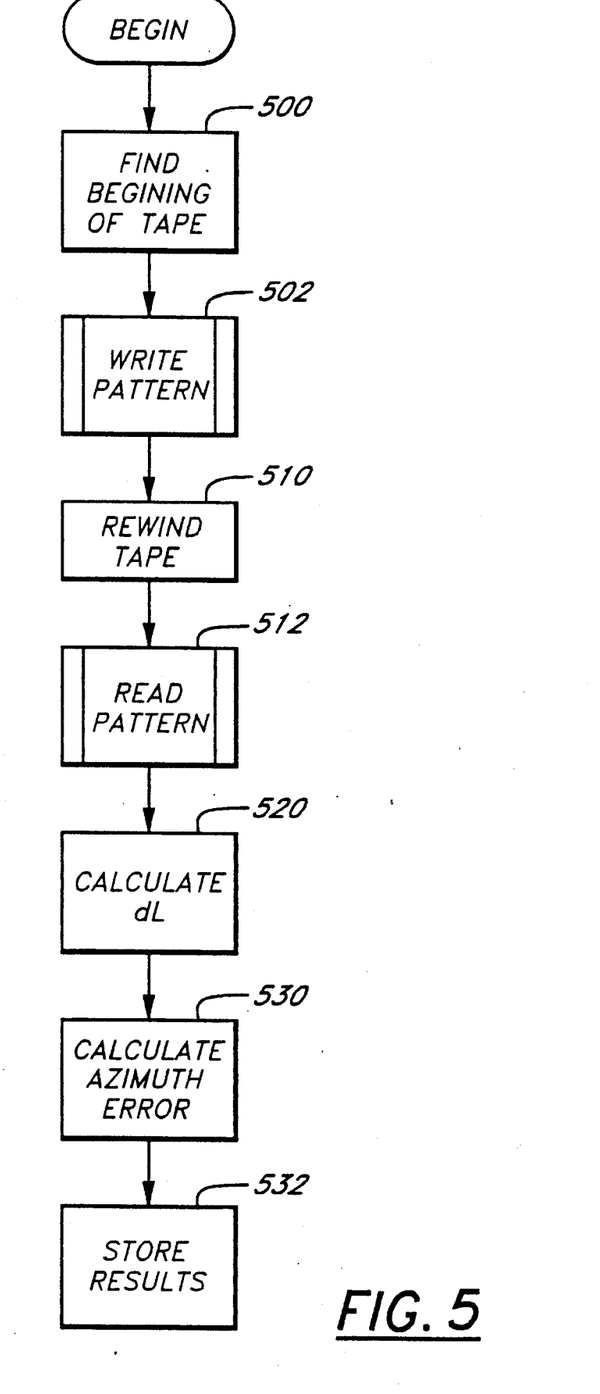
FIG. 5 illustrates an exemplary flow chart for the overall method of the present invention.
Figure 6:
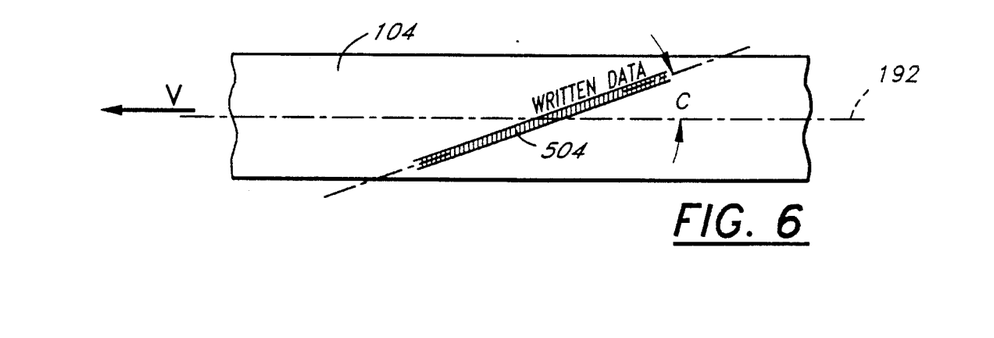
FIG. 6 illustrates a data pattern written onto a tape at a slope such that the centerline of the data pattern is at an angle C with respect to the centerline of the tape.

FIG. 5 is an exemplary flow chart of the overall method of a preferred embodiment for calculating the alignment error "A-B" in accordance with the invention. Initially, the beginning of the tape 104 is found in a process block 500. The detection of the beginning of the tape 104 is accomplished in a conventional manner. After finding the beginning of the tape 104, the method enters a write pattern subroutine block 502 wherein a predetermined data pattern is written onto the tape 104 at an angle "C" relative to the edge of the tape 104. The data pattern must be written oblique (i.e., neither parallel nor perpendicular) to the centerline of the tape 104. The data pattern is represented in FIG. 6 by a line 504 on a section of the tape 104. The written data pattern 504 is readily detectable by the read circuit 162. For example, the data pattern 504 may advantageously comprise a conventional gap signal (alternating ones and zeros at the highest writing frequency). The write subroutine 502 will be described in greater detail below in connection with FIG. 8.

Figure 7A:
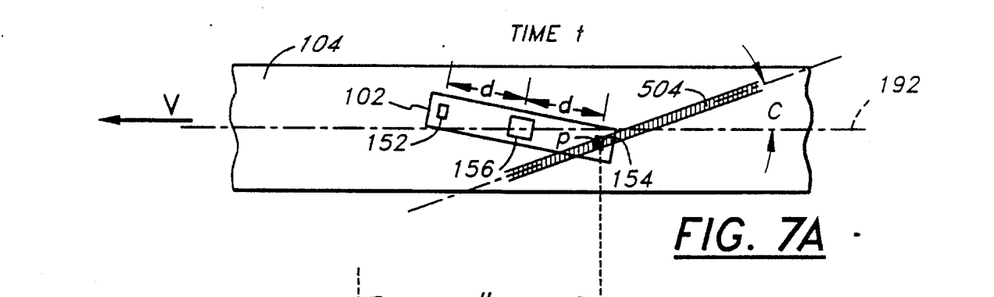
FIGS. 7A and 7B depict a data pattern moving past the head block as the tape moves.
Figure 7B:
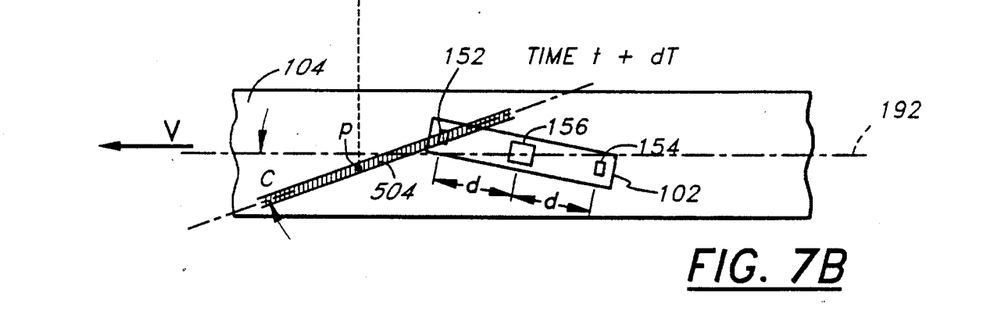

Returning to FIG. 5, following the write subroutine 502, the method enters a process block 510 wherein the tape 104 is rewound so that the read/write head system 102 is positioned ahead of the written pattern 504. After the tape 104 has been rewound, the method enters a read pattern subroutine 512 wherein the written data pattern 504 is detected by the read forward head 152 and the read reverse head 154. This is illustrated pictorially in FIGS. 7A and 7B. FIG. 7A shows that as the tape 104 moves in the forward direction (i.e., from right to left), the written data pattern 504 is first detected by the read reverse head 154. Thereafter, as the tape 104 moves further to the left, as illustrated in FIG. 7B, the written data pattern 504 is detected by the read forward head 152. There will be a difference in the times when the two read heads 152, 154 detect the written data pattern 504. The time difference depends upon the distance between the two heads (shown as "2d", where "d" is the distance from the center of the write head 156 to the center of either of the two read heads 152, 154), the velocity of the tape (shown as "V" in FIGS. 7A and 7B), the angle "C", and the angle "A-B". The times at which the read heads detect the data pattern are recorded. The read subroutine 512 is described more fully in connection with FIG. 9.

As discussed above in connection with FIG. 1, the multiplexer 170 allows both read head heads 152, 154 to be sampled at substantially the same time. The sampling rate is selected to be sufficiently high (e.g., every 25 to 50 microseconds) so that the sampling error is insignificant compared to the measured detection times. Alternatively, as discussed above, a separate read circuit can be provided for each head so that the read heads 152, 154 are monitored continuously.

Following the read subroutine 512, the method enters a process block 520. In the process block 520, a distance dL is calculated using the time measurements obtained in the read subroutine 512. As illustrated in FIGS. 7A and 7B, the distance dL is the distance that the tape moves during the time between the detection of the written data pattern 504 by the reverse read head 154 and the detection of the written data pattern 504 by the forward read head 152.

After calculating the distance dL in the process block 520, the method enters a process block 530 wherein the angle "A-B" between the read/write head system centerline 194 and the tape centerline 192 is calculated. In addition, the lateral displacement between the read forward head 152 and the write head 156 is calculated. As discussed above, the lateral displacement is the distance from the center of the written data track 504 to the center of read forward head 152. Similarly, the lateral displacement of the read reverse head 154 from write head 156 is also calculated. Thereafter, in a process block 532, the calculated displacements are stored. As will be discussed below, the calculated displacements are later referenced in order to correct the azimuth error between the tape centerline 192 and the read/write head system centerline 194.

Figure 8:
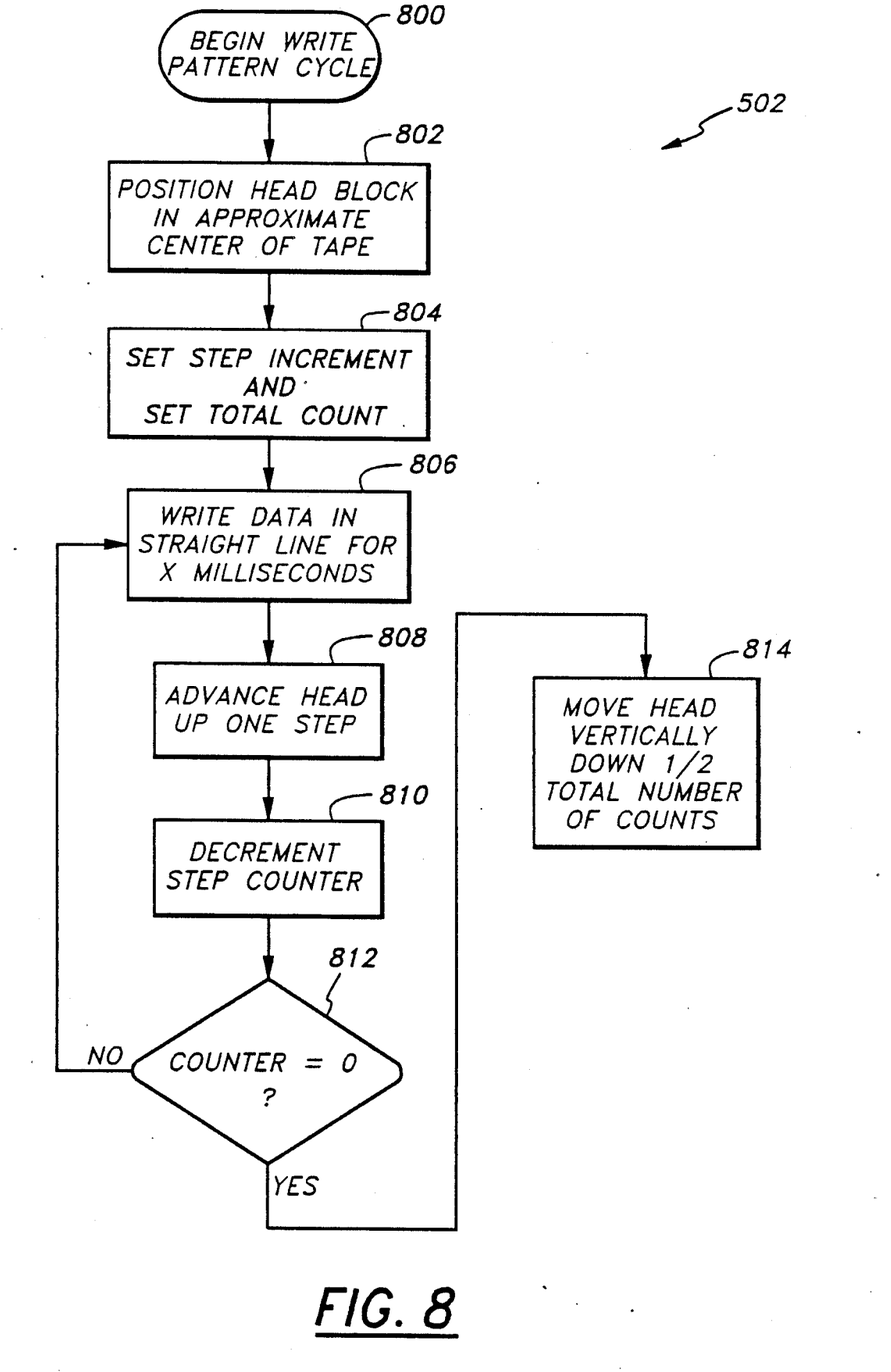
FIG. 8 illustrates an exemplary flow chart for the write data pattern subroutine of the method of the present invention.

FIG. 8 illustrates the details of the write subroutine 502 of FIG. 5, wherein a method is outlined for writing a data pattern at an angle "C" relative to the edge of the tape 104. In a first process block 802, the read/write head system 102 is positioned approximately in the center of the tape 104 by applying appropriate signals to the stepper motor 140. Next, in a process block 804, a step increment, "s" and a total count are set. The step increment "s" is usually the smallest increment size available. The total count determines the number of steps to be taken across the tape, and is stored in an internal step counter in the microprocessor 120 (e.g., a register or a memory location). For example, when the present invention is implemented in an exemplary streaming tape drive to implement the QIC-1350 standard, the step increment "s" is equal to 0.000125 inches.

After the step increment is set, the writing of the data pattern begins. Since the lateral portion of the read/write system 102 is controlled by the stepper motor 140, a straight line at the angle "C" cannot be generated. Instead, an approximation of a straight line is generated by writing the pattern in a cycle wherein the method alternates between writing data, and stepping the read/write head system 102 up by one increment. The method enters a process block 806 wherein a data pattern is written in a straight line relative to the edge of the tape 104. This data line is written onto the tape 104 for "X" milliseconds (this write time may be on the order of 1 millisecond). The length of the written data line for each step can be calculated as "X" (the write time) multiplied by "V", the tape velocity. Following the writing of the data line, the method enters a process block 808 wherein the read/write head system 102 is advanced one step increment by the stepper motor 140. In a process block 810, the step counter is decremented. As shown in a decision block 812, if the step counter is not equal to zero, then the method returns to the process block 806 and a straight data line is written again for X milliseconds at the new lateral location on the tape 104. Thereafter, the method again enters the process block 808 and the read/write head system 102 is advanced one step up. Following the advancement of the read/write head block system 102, the cycle enters the process block 810 and the step counter is again decremented. Thereafter the method enters decision block 812 and the test for zero in the step counter is repeated. This cycle continues until the step counter reads zero.

The total distance laterally stepped across the width of the tape 104 during the write cycle is equal to the total number of counts, multiplied by the step increment "s". This distance should be greater than the lateral displacement (as measured perpendicular to the tape centerline 192) between the reverse read head 154 and the forward read head 152. In this way, when the read/write head system 102 is moved to the nominal position (approximately in the center of the tape 104) both read heads may pass below the upper portion of the written data pattern 504, and above the lower portion of the written data pattern 504.

Figure 10:
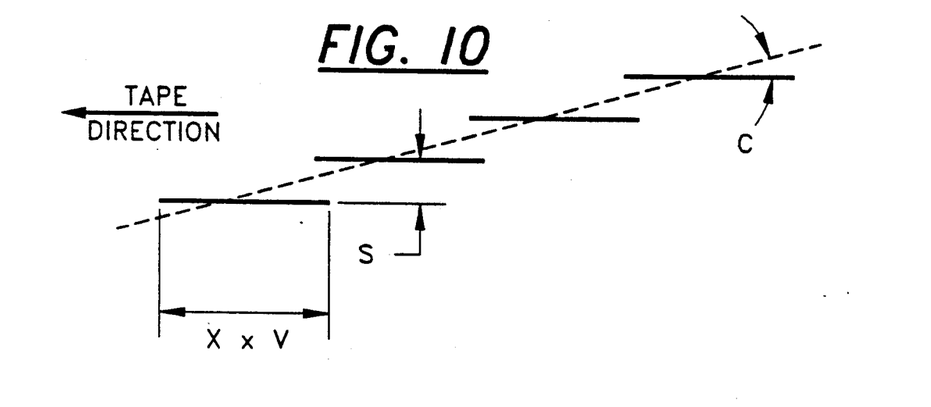
FIG. 10 illustrates a sample data pattern written onto the tape in accordance with the present invention.

The resulting written data pattern has an appearance similar to the sample data pattern illustrated in FIG. 10. As illustrated, the data pattern comprises a plurality of small steps. The step increment, "s", is selected to be sufficiently small so that the overall data pattern appears to be a continuous line with a slope "C" relative to the edge of the tape 104. This angle "C" can be calculated from known values as:

$$C = Arctan[s/(X \times V)] \quad (1)$$

where "s" is the stepping increment of the stepper motor 140, "X" is the write time for each line of data, and "V" is the tape 104 velocity.

Once the step counter reads zero, the method branches from the decision block 812 to a process block 814 wherein the head is moved down vertically one-half the total number of counts. This is done in order to position the read heads 152, 154 in the nominal position approximately in the middle of the data track so that the read heads 152, 154 do not miss the written data pattern 504 by passing either above or below the written data.

Following the write pattern subroutine 502, the tape 104 is rewound in a conventional manner. The read heads 152, 154 are positioned on a blank portion of the tape 104 ahead of the written data pattern, so that as the tape 104 begins to stream (i.e., from right to left as depicted in FIGS. 7A and 7B) the written data pattern 504 will traverse across the read/write head system 102. In order to obtain the best error measurement results, the incline of "C" should be shallow (on the order of 20 minutes of arc). This will allow the read heads 152, 154 to move across the written data pattern 504 gradually during the read subroutine 512.

Figure 9:
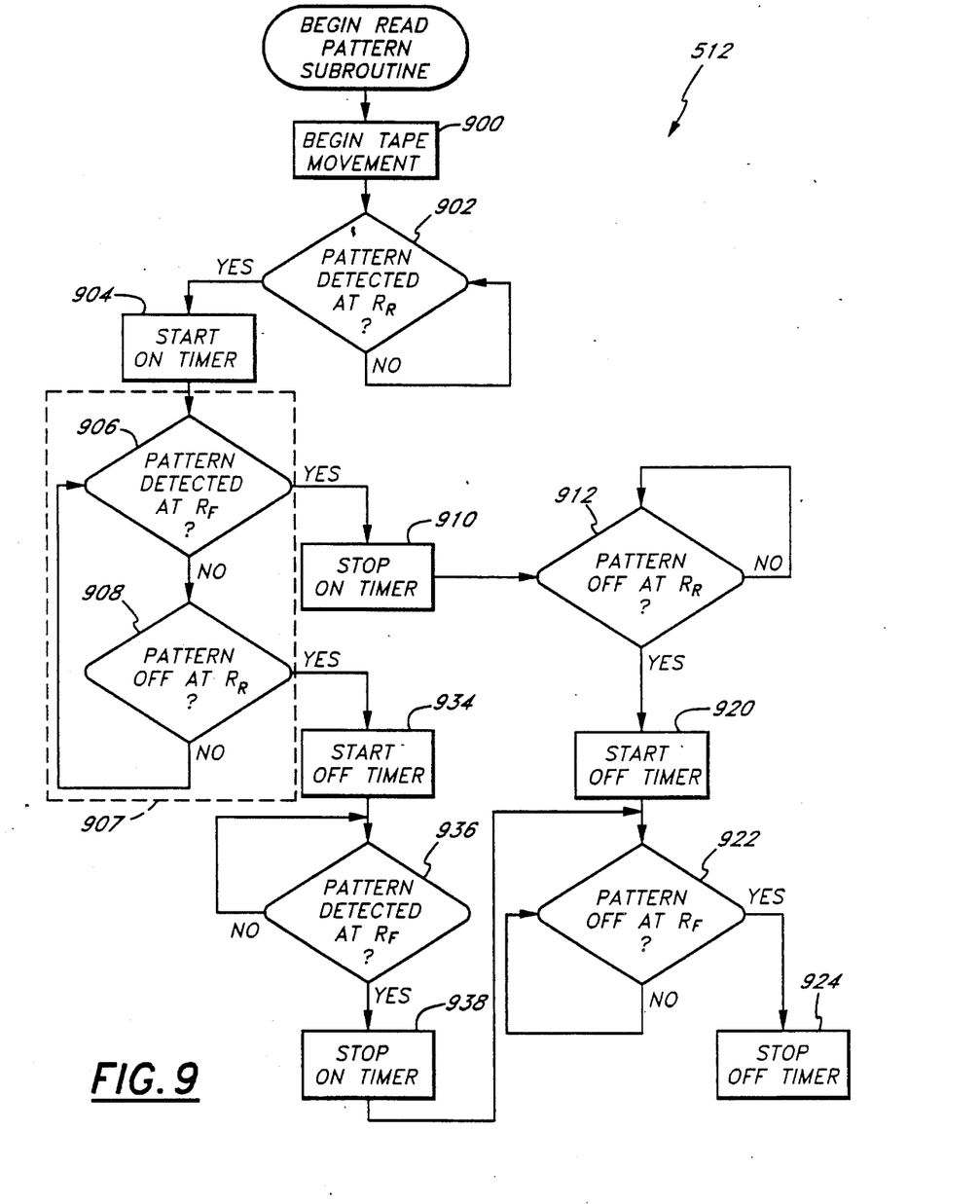
FIG. 9 illustrates an exemplary flow chart of the read data pattern subroutine of the method of the present invention showing the alternative paths for controlling the ON TIMER and the OFF TIMER.

FIG. 9 shows the details of the read pattern subroutine 512 of FIG. 5. After the read pattern subroutine 512 is initiated, the method enters a process block 900 wherein a signal is sent to begin the tape 104 movement. The read/write head system 102 is initially positioned in the write subroutine 502 so that both read heads 152, 154 are assured of passing through the written data pattern 504 as the tape 104 moves. The method next enters a decision block 902, where a test is performed to determine if the written data pattern 504 is detected on the reverse read head 154. Once the written data pattern 504 is detected on the reverse read head 154, the method branches from the decision block 902 to a process block 904, wherein a timer (ON TIMER) is started. The ON TIMER and an OFF TIMER to be described below are preferably implemented as internal counters (e.g., registers or memory locations) of the microprocessor 120.

Figure 11A:
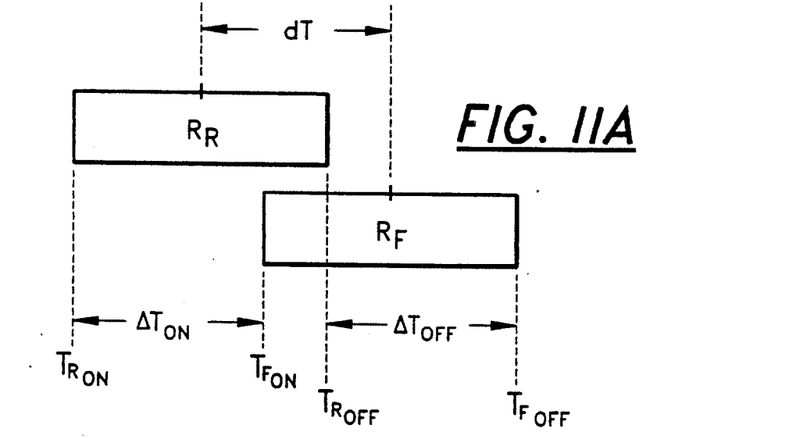
FIGS. 11A and 11B illustrate diagrams that show the time relationship for read head pattern detection in two separate cases.
Figure 11B:
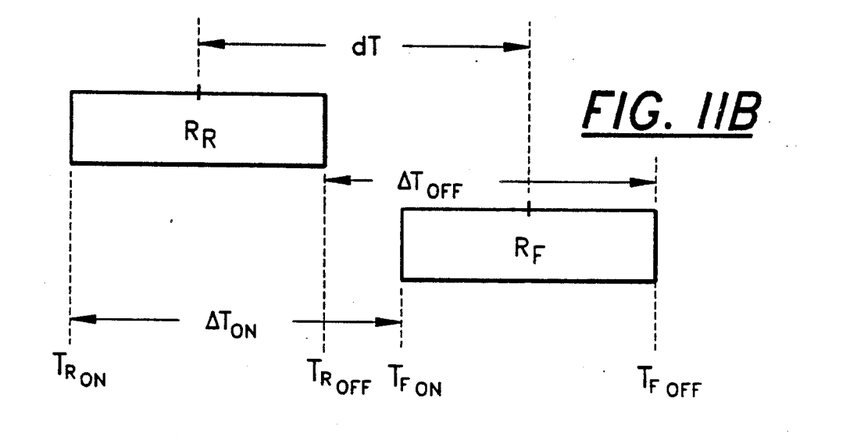

After the ON TIMER is started in the process block 904, the method enters a dual decision loop 907. This dual decision loop 907 comprises a decision block 906 and a decision block 908. The function of the dual decision loop 907 is to determine which method to implement for a given sequence of data pattern detection. The written data pattern 504 may be detected in two different sequences, illustrated in FIGS. 11A and 11B. FIG. 11A depicts a case where the written pattern 504 is sensed at the forward read head 152 while the written pattern 504 continues to be sensed at the reverse read head 154. FIG. 11B depicts a case where the written data pattern 504 ceases to be detected at the reverse read head 154 before it begins to be sensed at the forward read head 152. Because the written data pattern 504 may be detected in either of the two sequences, the method of reading the written data pattern 504 is divided into two branches described below.

Initially, the method enters the decision block 906. If the data pattern is detected on the forward read head 152 first, then the method branches a process block 910, wherein the ON TIMER is stopped. If the data pattern is not detected on the forward read head 152 first, then the method continues to the decision block 908. In the decision block 908, a test is performed to see if the written data pattern 504 has passed (e.g., is no longer detected at) the reverse read head 154. If not, then the method branches back to the decision block 906. This cycle repeats itself until one of the test conditions is satisfied.

For the sake of illustrating the flow chart in an orderly manner, it shall be assumed that the written data pattern 504 is detected at the forward read head 152 before the written data pattern 504 has passed the reverse read head 154 (as depicted in FIG. 11A). The other case where the written data pattern 504 has passed the reverse read head 154 before the written data pattern 504 is detected at the forward read head 152 will be discussed later in connection with FIG. 11B.

As illustrated in FIG. 9, if the written data pattern 504 is detected at the forward read head 152 while continuing to be detected at the reverse read head 154, the method exits the decision block 906 and branches to the process block 910 wherein the ON TIMER is stopped. The time corresponding to the count in the ON TIMER is stored as $\Delta T_{ON}$. The method next enters a decision block 912 where it waits until the written data pattern 504 has passed the reverse read head 154. After the pattern is no longer sensed at the reverse read head 154, the method enters a process block 920 wherein the OFF TIMER is started. The method now enters a decision block 922 where a test is performed to determine if the written data pattern 504 is still detected at the forward read head 152. When the written data pattern 504 moves past the forward read head 152, the decision block 922 is exited to a process block 924, where the OFF TIMER is stopped. The new time corresponding to the count in the OFF TIMER is stored as $\Delta T_{OFF}$.

Returning to the second case, as illustrated in FIG. 11B a situation could arise where the reverse read head 154 is "off" (the written data pattern 504 is not detected at the reverse read head 154) before the forward read head 152 goes "on" (the written data pattern 504 is detected at the forward read head 152). This situation may occur, for example, if the written data pattern 504 is written at a steep slope (e.g., C is large relative to A or B).

If the written data pattern 504 is "off" at the reverse read head 154 before the written data pattern 504 is "on" at the forward read head 152, then the method proceeds to a process block 934 wherein a second timer, the OFF TIMER, is initiated. After this, a test occurs in a decision loop 936 to determine if the written data pattern 504 is detected at the forward read head 152. When the written data pattern 504 is detected at the forward read head 152, the method enters a process block 938 wherein the ON TIMER is stopped, and the ON TIMER reading is stored as $\Delta T_{ON}$. Thereafter, the method enters the decision block 922 where it waits until the written data pattern 504 is no longer sensed at the forward read head 152, at which time the OFF TIMER is stopped in the process block 924. The time corresponding to the count in the OFF TIMER is stored as $\Delta T_{OFF}$.

Although described above in connection with the particular embodiment of the write pattern subroutine 502 and read pattern subroutine 512, it should be understood that other subroutines can be used to measure the propagation time between the detection of a data pattern by the read reverse head 154 and the read forward head 152.

With the measured values of $\Delta T_{ON}$ and $\Delta T_{OFF}$, and the known values of the tape velocity "V" and slope "C" of the written data pattern 504, the error of alignment between the read/write head block centerline 194 and the tape centerline 192 can be calculated.

The values of $\Delta T_{ON}$ and $\Delta T_{OFF}$ can be used to calculate the distance dL. As illustrated in FIGS. 7A and 7B, the distance dL is the distance the tape 104 moves between the reverse read head 154 detection time and the forward read head 152 detection time. As illustrated in FIG. 7A, the center of the written data pattern 504 crosses the reverse read head 154 at a point "P". At a later time, as illustrated in FIG. 7B, the center of the written data pattern 504 crosses the forward read head 152. If the read/write head system 102 is misaligned with respect to the tape centerline 192, the forward read head 152 will cross the center of the written data pattern 504 at some point other than point "P". For this reason, the point "P" will have traveled a distance dL which may not be equal to the distance 2d between the read heads 152, 154. The angles in FIGS. 7A and 7B have been exaggerated in order to more clearly depict the difference between the distance dL and the distance 2d.

In FIGS. 11A and 11B more clearly illustrate the significance of $\Delta T_{ON}$ and $\Delta T_{OFF}$. In order to accurately calculate the distance dL, the center crossing points for each head are determined in the patterned embodiment of the present invention. Since the written data pattern 504 has a certain width, there is a variance introduced when determining the points where each read head "crosses" the written data pattern 504. For example, if the crossing point is determined to be at the left edge of the written data pattern 504 for the forward read head 152, and at the right edge of the written data pattern 504 for the reverse read head 154, the distance dL, would be greater than a case where the crossing points were both determined to be at the left edge of the written data pattern 504 for each read head 152, 154. In order to avoid this error, a time averaging is performed to determine the point in time where each read gap passes across the center of the written data pattern 504.

In FIGS. 11A and 11B, two time bars are depicted, one above the other. The top time bar in each figure represents the time period that the reverse read head 154 passes through the data pattern. $T_{RON}$ is the time at which a selected threshold amplitude is exceeded at the output of the reverse read head 154 and the written data pattern 504 is detected, and $T_{ROFF}$ is the time at which the amplitude of the written data pattern 504 is no longer detected above the threshold level at the reverse read head 154. The bottom time bar in each figure represents the time period over which the forward read head 152 passes through the written data pattern 504. $T_{FON}$ and $T_{FOFF}$ correspond to the time the written data pattern 504 is detected at the forward read head 152, and the time the written data pattern 504 is no longer detected at the forward read head 152 respectively. Each time bar depicted has a center mark which represents the time, halfway between the $T_{ON}$ and $T_{OFF}$ times, that the center of the respective read head 152, 154 passes across the center of the written data pattern 504. FIG. 11A depicts the first case where the time bars overlap, while FIG. 11B depicts the second case where the time bars do not overlap.

As depicted in FIG. 11A, the time difference dT between the two center points of the read heads 152, 154 can be calculated as:

$$dT = [(T_{FON} + T_{FOFF})/2] - [(T_{RON} + T_{ROFF})/2] \quad (2)$$

Equation (2) can be rearranged algebraically to read:

$$dT = [(T_{FON} - T_{RON})/2] + [(T_{FOFF} - T_{ROFF})/2] \quad (3)$$

It can be seen that $T_{FON} - T_{RON}$ is equal to $\Delta T_{ON}$, and $T_{FOFF} - T_{ROFF}$ is equal to $\Delta T_{OFF}$. Therefore Equation (3) reduces to:

$$dT = \Delta T_{ON}/2 + \Delta T_{OFF}/2 \quad (4)$$

In other words, the time difference between the points where the read heads 152, 154 cross the center of the written data pattern 504, is calculated as the average of $\Delta T_{ON}$ and $\Delta T_{OFF}$ which were measured as described above.

In FIG. 11B, the same equations apply, however, the different sequence of events necessitates a modified route through the read subroutine 512 flowchart (FIG. 9). In the event that the reverse read head 154 passes completely across the written data pattern 504 before the forward read head 152 initially detects the written data pattern 504, the method must assure that the OFF TIMER is initiated promptly, rather than waiting until the ON TIMER stops.

Now that the time difference dT has been determined, the distance dL can be computed as dT×V, where "V" is the tape 104 velocity. Using the calculated distance dL and the known distance between the read heads 2d, a physical diagram can be drawn to determine the angle of displacement A-B, between the tape centerline 192 and the read/write head centerline 194.

Figures 12A, 12B:
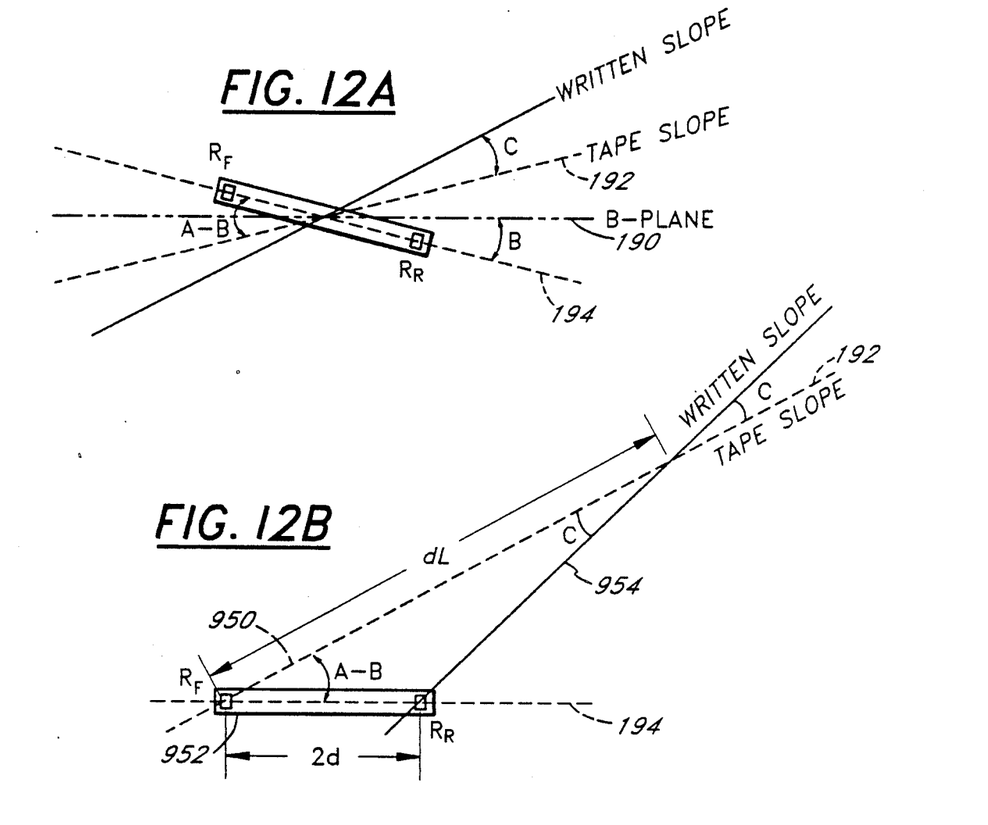
FIGS. 12A, 12B and 12C illustrate the angular and scaler relationships between the read/write head system and the tape, further illustrating the slope of the data track written in accordance with the present invention.

FIGS. 12A and 12B diagram the geometry involved in the calculation of the angle A-B. In order to facilitate calculation of A-B, some assumptions should be made. Since the angles under consideration are small, it can be assumed that the tangents of each of the angles A, B, and C are equal to the sines of their respective angles. The sines in turn are equal in magnitude to their respective angles (e.g., $\tan A = \sin A = A$; $\tan B = \sin B = B$; and $\tan C = \sin C = C$).

FIG. 12A illustrates the different angles involved in the calculation of A-B. In FIGS. 12A and 12B, the blocks RF and RR represent the forward and reverse read heads 152, 154, separated by a distance $2d$. The read/write head centerline 194 passes through RF and RR, and is shown to have the angle "B" relative to the B-plane. The tape centerline 192, labelled as "TAPE SLOPE", is offset by the angle "A" relative to the B-plane. Finally, the written data pattern 504 is represented in FIG. 12A by a line offset from the tape centerline 192 by the angle "C".

The same angles can be repositioned as illustrated in FIG. 12B to construct a triangle having a first side 950 of length dL and a second side 952 of length $2d$. As diagramed, the first side 950 lies along the tape centerline 192, and the second side 952 lies along the read/write head centerline 194. The angle between the first side 950 and the second side 952 is the angle "A-B", as shown. A third side 954, opposite the angle "A-B", corresponds to the written data pattern 504 and is oriented at the angle "C" with respect to the tape centerline 192 and thus with respect to the first side 950.

The triangle depicted in FIG. 12B can be analyzed to determine the angle of misalignment between the centerline of the tape 104, and the centerline of the read/write head block system 102.

Using the known values for the angle "C" and the sides dL and $2d$, the law of sines can be used to calculate the unknown angle "A-B". In accordance with the trigonometric law of sines, the relationship between the two known sides and the opposite angles is:

$$2d/\sin(C) = dL/\sin(180-(A-B)-C) = dL/\sin((A-B)+C) \quad (5)$$

Equation (5) can be rearranged as:

$$\sin((A-B)+C)/dL = \sin(C)/2d \quad (6)$$

As set forth above, for the small angles of offset expected herein, the sine of an angle is substantially equal to the angle itself. Thus, Equation (6) can be reduced to:

$$(A-B+C)/dL = C/2d \quad (7)$$

Finally, by rearranging Equation (7), the angle between the tape centerline 192 and the read/write head centerline 194 is calculated to be:

$$A-B = C(dL-2d)/2d \quad (8)$$

Figure 12C:
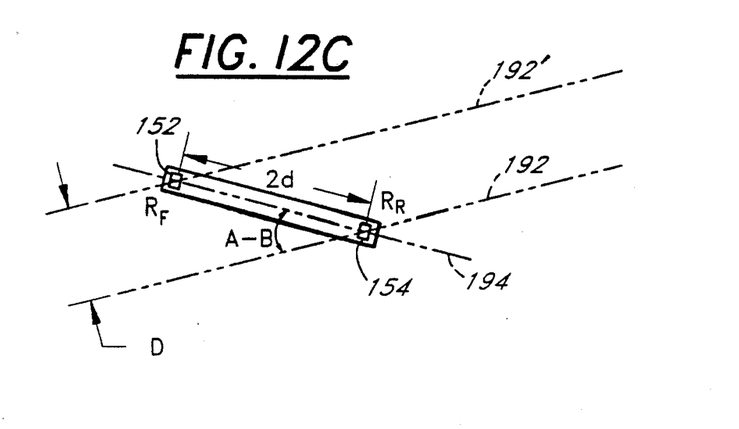

After the angle of displacement, A-B, is calculated in Equation (8), the distances to be stepped for the different cases of reading and writing can then be obtained. As illustrated in FIG. 12C, a lateral distance "D" between the two read heads 152, 154 in a direction perpendicular to the tape centerline 192 is equal to $2d$ times the sine of the angle "A-B". Since the sine of the angle "A-B" for the small angle is substantially equal to the angle, the lateral distance "D" can be found by multiplying A-B by the distance $2d$ between the two read heads 152, 154. One will appreciate that for the small angles involved, the distance "D" is substantially equal to the distance required to step the read/write head system 102 from a location where the read forward head 152 is centered on a data track on the tape 104 to a location where the read reverse head 154 is centered on that same data track. For example, in FIG. 12C, a centerline 192', is the center of a data track on which the read forward head is originally centered. When the read/write head system 102 is stepped by the distance "D", the read reverse head 154 will be substantially centered on the same track (i.e., approximately on the centerline 192').

In a conventional streaming cartridge tape drive, it is advantageous to know the lateral displacement between the forward read head 152 and the reverse read head 154. Once the lateral displacement between the forward read head 152 and the reverse read head 154 is known, the read/write head system 102 can be stepped to the next data track by the appropriate value.

Figure 13A:
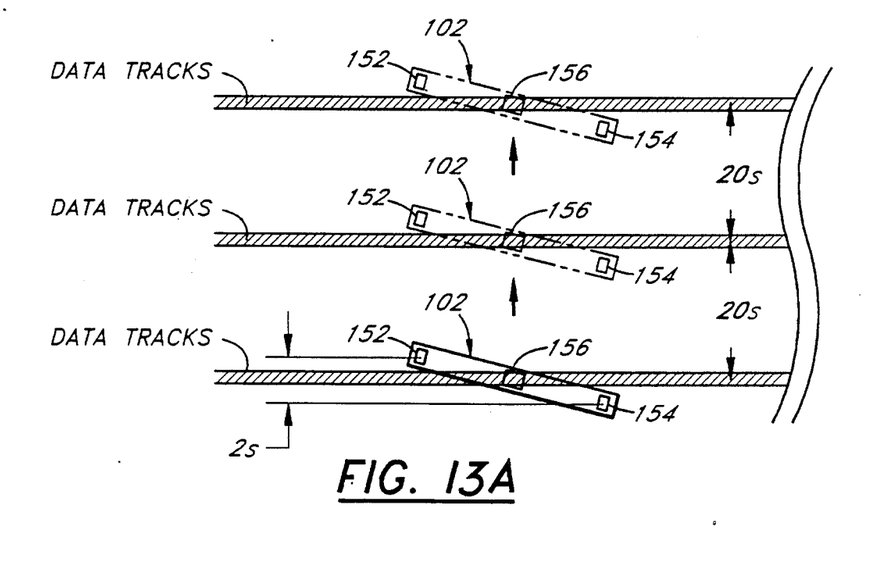
FIGS. 13A and 13B illustrate the effect of the present invention in adjusting the number of steps between adjacent data tracks when reading forward and reading reverse in accordance with the calculated lateral displacement between the read forward head and the read reverse head.
Figure 13B:
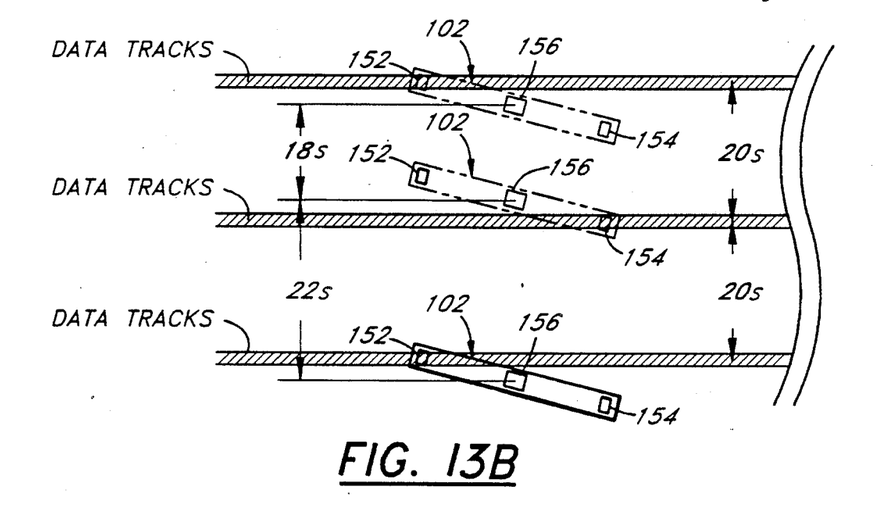

An example of the stepping process is illustrated in FIGS. 13A and 13B. As depicted in FIG. 13A, the distance between adjacent written data tracks is twenty steps since the read/write head system 102 is stepped by equal amounts between adjacent tracks. The lateral displacement between the forward read head 152 and the reverse read head 154 is two steps (as determined by dividing the calculated distance "D" by the known stepping distance "s"). FIG. 13B depicts the read/write head system 102 as it reads data alternately in forward and reverse mode on adjacent tracks. As further illustrated in FIG. 13B, the total increment stepped from reading with the forward read head 152 to reading with the reverse read head 154 is 22 steps, while the total increment stepped from reading with the reverse read head 154 to reading with the forward read head 152 is 18 steps. In this way, the read/write head system 102 can be positioned accurately onto each data track when data is being read. The information calculated with respect to the lateral displacement of the two read heads 152, 154 can be saved for a particular tape drive (for example, in non-volatile read/write RAM). Thereafter, whenever a tape is read, the tape drive can be adjusted to provide maximum playback amplitude for the read forward head 152, for example. Thereafter, the read/write head system 102 can be stepped from track to track making the stepping adjustment described above when stepping from a forward written data track to a reverse written data track. It is not necessary to make separate adjustments for the forward and reverse data tracks.

The above described embodiment has been illustrated with a read/write head system 102 wherein the write head 156 is positioned midway between the forward read head 152 and the reverse read head 154. This is particularly useful for reading data immediately after writing the data. It should be understood that the present invention can be used for other read/write head systems wherein the write head is not positioned on the same centerline between the two read heads. However, in the embodiment herein where the write head 156 lies midway between and in alignment with the two read heads 152, 154, the lateral offset between the write head 156 and one of the read heads 152 or 154 can be calculated as being one-half the distance D.

The present invention can also be used in combination with a tape drive which has a read/write head system having two heads, at least one of which is utilized for both writing data onto a tape as well as reading data from the tape. It can be readily understood that once the data pattern is written onto the tape by a head operating as a write head, the lateral displacement between the two heads can be found by operating both heads as read heads in accordance with the above-described method.

What is claimed is:

1. A method for calibrating a read/write head system of a tape drive that writes data onto and reads data from a magnetic tape in a tape cartridge within said tape drive, wherein said read/write head system comprises a write head that writes data onto said tape in the form of magnetic flux transitions, first and second read heads that sense said magnetic flux transitions and generate electrical signal outputs responsive thereto, and at least one read circuit responsive to said electrical signal outputs of said first and second read heads to generate electronic data signals, said first and second read heads aligned with respect to each other along a read head centerline therebetween, and said tape moving within said cartridge in a direction defined by a tape centerline, said method comprising the steps of:

writing a predetermined data pattern on a portion of said tape such that said data pattern is oblique to said tape centerline;

positioning said read/write head system so that said first and second read heads are positioned ahead of said predetermined data pattern;

moving said tape longitudinally past said first and second read heads while monitoring the electrical signal outputs from said read heads;

determining a time difference between when said first read head senses said predetermined data pattern and when said second read head senses said predetermined data pattern; and calculating a displacement of said first read head with respect to said second read head in a direction substantially perpendicular to said tape centerline using said time difference.

2. The method as defined in claim 1, wherein said step of writing said predetermined data pattern comprises the steps of:

writing data in a straight line with respect to said tape centerline for a predetermined period of time;

moving said read/write head system by a known distance in a first direction substantially perpendicular to said tape centerline; and repeating said writing step alternately with said moving step for a predetermined number of steps, such that said predetermined data pattern is written at an effective angle with respect to said tape centerline.

3. The method as defined in claim 1, wherein said step of determining said time difference comprises the steps of:

measuring a first elapsed time between when first read head first senses said predetermined data pattern and when said second read head first senses said predetermined data pattern;

measuring a second elapsed time between when said first read head first ceases sensing said predetermined data pattern and when said second read head first ceases sensing said predetermined data pattern; and averaging said first elapsed time and said second elapsed time to determine said time difference.

4. The method as defined in claim 3, wherein said step of determining said time difference comprises the steps of:

sensing a first edge of said predetermined data pattern at said first read head at which time a first timer is initiated;

sensing a second edge of said predetermined data pattern at said first read head at which time a second timer is initiated;

sensing said first edge of said predetermined data pattern at said second read head at which time said first timer is stopped with a first value stored therein representing the first elapsed time;

sensing said second edge of said predetermined data pattern at said second read head at which time said second timer is stopped with a second value stored therein representing the second elapsed time; and calculating the average value of said first and second values to determine said time difference.

5. The method as defined in claim 2, wherein said positioning of said read/write head system ahead of said predetermined data pattern includes the step of moving said read/write head system in a second direction opposite said first direction by approximately half said predetermined number of steps.

6. A method of determining the lateral displacement of first and second read heads in a tape drive wherein a tape is moved longitudinally past said first and second read heads, wherein said first and second read heads have a known longitudinal displacement therebetween, and wherein said lateral displacement is in a direction substantially perpendicular to the longitudinal movement of said tape, said method comprising the steps of:

writing a predetermined data pattern on said tape at a selected oblique angle with respect to said longitudinal movement of said tape;

positioning said tape so that said predetermined data pattern is ahead of said first and second read heads;

moving said tape longitudinally past said first and second read heads until both read heads have sensed said predetermined data pattern;

measuring a time difference between when said first read head senses said predetermined data pattern and when said second read head senses said predetermined data pattern; and calculating the lateral displacement of said first read head with respect to said second read head using said measured time difference, said known longitudinal displacement, and said selected angle of said predetermined data pattern.

* * * * *